US006442750B1

(12) United States Patent
Lopes et al.

(10) Patent No.: US 6,442,750 B1
(45) Date of Patent: Aug. 27, 2002

(54) DESIGN BY CONTRACT WITH ASPECT-ORIENTED PROGRAMMING

(75) Inventors: Cristina V. Lopes, San Francisco, CA (US); Martin Lippert, Hamburg (DE); Erik A. Hilsdale, Bloomington, IN (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/426,142

(22) Filed: Oct. 22, 1999

Related U.S. Application Data

(63) Continuation-in-part of application No. 09/357,508, filed on Jul. 20, 1999.

(51) Int. Cl.[7] .................................................. G06F 9/44
(52) U.S. Cl. ...................................... 717/126; 717/127
(58) Field of Search ................................ 717/126, 127, 717/144; 709/223, 224, 315

(56) References Cited

U.S. PATENT DOCUMENTS

| | | | | |
|---|---|---|---|---|
| 5,822,593 | A | * 10/1998 | Lamping et al. | ............. 717/144 |
| 6,018,625 | A | * 1/2000 | Hayball et al. | ............. 709/223 |
| 6,212,676 | B1 | * 4/2001 | Seaman et al. | ............. 717/127 |
| 6,233,610 | B1 | * 5/2001 | Hayball et al. | ............. 709/223 |

OTHER PUBLICATIONS

Walker et al., An Initial Assessment of Aspect–Oriented programming, May 16, 1999, pp. 1–10, ACM.*

Irwin et al., Aspect–Oriented Programming of Sparse Matrix Code, 1997, pp. 1–9, Internet.*

Mendhekar et al., RG: A Case–Study for Aspect Oriented Programming, Feb. 1997, pp. 21–33, Internet.*

Murphy et al., Evaluating Emerging Software Development Technologies: Lessons Learned from Assessing Aspect–Oriented Programming, Jul. 1999, pp. 438–455, IEEE.*

Kersten et al., Atlas: A Case Study in Building A Web–Based Learning Environment using Aspect–Oriented Programming, 1999, pp. 1–13.*

Kiczales, G., Lamping, J., Mendhekar, A., Maeda, C., Lopes, C. V., Loingtier, J–M., Irwin, J., "Aspect–Oriented Programming", published in Proceedings of the European Conference on Object–Oriented Programming (ECOOP), Finland. Springer–Verlag LNCS 1241, Jun. 1997, © 1997.

* cited by examiner

*Primary Examiner*—Gregory Morse
*Assistant Examiner*—John Q. Chavis
(74) *Attorney, Agent, or Firm*—Peter Y. Wang

(57) ABSTRACT

An aspect oriented system for implementing the Design by Contract software development methodology is provided in which preconditions and postconditions defining the contract need not be coded into the program modules being developed. Rather, an aspect is provided which encapsulates these preconditions and postconditions. This behavior may easily and transparently be forced onto the resource by compiling the object class for the program module along with the contract aspect. When the software program in which the program modules is used is no longer needed, the preconditions and postconditions are removed simply by recompiling the resource object classes without the aspect.

6 Claims, 1 Drawing Sheet

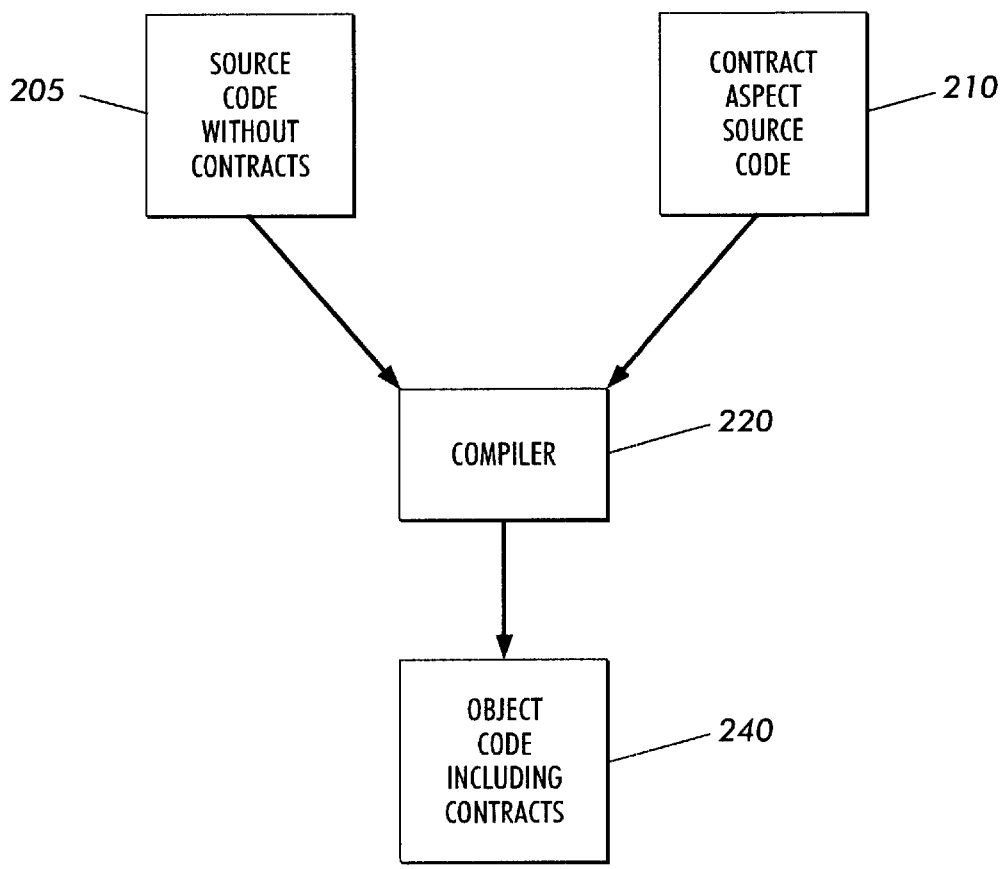

DESIGN BY CONTRACT WITH ASPECT-ORIENTED PROGRAMMING

CROSS REFERENCE TO RELATED APPLICATIONS

This application is a continuation-in-part of Application Ser. No(s). 09/357,508, filed Jul. 20, 1999.

This invention was made with Government support under Contract F30602-97-C-0246 awarded by the Air Force. The Government has certain rights in this invention.

FIELD OF THE INVENTION

The present invention relates generally to designing software applications, and more particularly to an aspect-oriented programming implementation for designing by contract.

BACKGROUND OF THE INVENTION

Modem software program are large and complex creations, often created by teams of developers. Because of the collaborative nature of software development, incompatible program modules commonly result, and debugging is required to resolve these differences. However, as is often the case, the resources expended in debugging a software program can rival those required to create the software program in the first place.

This situation can be avoided by not creating the incompatibilities in the first place. This may be done through Design by Contract. Design by Contract is a design methodology in which every program module designed states very explicitly and clearly the preconditions for using that module correctly and the postconditions that module guarantees. The benefit of stating these up front is that bugs in the implementation may be detected more quickly because the preconditions and postconditions may be checked at runtime. Reliability is built into the software program so no debugging is necessary later.

This methodology is referred to as Design by Contract because it acts in a way that mirrors human contracts. In essence, a program offers to provide something in exchange for something else. More specifically, the program module guarantees that certain postconditions will be satisfied if the caller satisfies certain preconditions.

For instance, if a precondition is violated, then the software calling the module is doing something wrong. If, on the other hand, a postcondition is violated, then an error exists in the implementation of the module.

Design by Contract is typically used during the development of software, but when the final product is ready for shipment, the preconditions and postconditions are removed to improve performance. By defining preconditions and postconditions, a routine and its callers may be bound in a contract. In other words, if a caller promises to call a routine with the preconditions satisfied, then the routine promises to deliver a final state in which the postconditions are satisfied. With this convention programming style is considerably simplified because by having the constraints which calls to a routine must observe specified as preconditions, the developer may assume when writing the routine body that the constraints are satisfied, and does not need to test for them in the body.

So if a square root function, meant to produce a real number as a result, is of the form sqrt (x: REAL): REAL is —Square root of x require x>=0 do . . . end the developer may write the algorithm for computing the square root without any concern for the case in which x is negative because this is taken care of by the precondition and becomes the responsibility of the clients.

While conventional programming wisdom would suggest that in order to create reliable software every component of the system should be designed so that it protects itself as much as possible, such as by providing checks, under the theory that while a redundant check may not help, at least it won't hurt.

However, the "at least it won't hurt" theory ignores the cost of computing. Redundant checks imply a performance penalty because the checks must be executed. If the checks are used, then they must be later removed to remove the performance penalty.

With Design by Contract, the checks are no longer needed because of the guarantee that for every interaction between two elements there is an explicit roster of mutual obligations and benefits, i.e., the contract. The contract specifies which party is responsible for the enforcement of each specified condition that could jeopardize a routine's proper functioning.

If the caller is to be responsible for enforcement of a particular condition, the condition is specified as a precondition of the routine. If the routine is to be responsible, then the condition will be expressed as a conditional instruction, or some functional equivalent, in the body of the routine.

A programming language called Eiffel was created to facilitate Design by Contract. Eiffel provides built-in features to support the implementation of Design by Contract. The example below illustrates those features. The following example shows a partial implementation of a bounded queue, with methods put and remove. The pre- and post-conditions for those methods are coded explicitly with the "require" and "ensure" features of Eiffel.

```
class BoundedQueue[G] feature
    put(x:G) is
        -- add x as newest element
        require
            not full
        do
            -- implementation of put
            ...
        ensure
            not empty
        end;
    remove is
        -- remove oldest element
        require
            not empty
        do
            -- implementation of remove
            ...
        ensure
            not full
        end;
        empty: BOOLEAN is
            -- is the queue empty?
            do Result:=. . . end;
        full: BOOLEAN is
            -- is the queue full?
            do Result:=. . . end;
    end
```

The assertions are checked at run-time. This checking can be turned on or off as a result of a compilation switch.

Design by Contract and the Eiffel programming language are described in more detail in Bertrand Meyer, Object- Oriented Software Construction, 2/e, Prentice-Hall PTR, 1997, which is hereby incorporated by reference.

In most traditional programming languages, Design by Contract is implemented by intertwining the implementation of the preconditions and postconditions with the implementation of the modules, such as in Table 1, which will be described in greater detail below.

With aspect-oriented programming, the implementations of the preconditions and postconditions may be extracted into aspects, so that they are easier to plug in and unplug from the program module being developed.

Traditional programming languages typically work well for design decisions that define a unit of functionality, such as a procedure or an object. Procedural languages such as for Fortran, Pascal, and C are useful for defining programs where the execution is straightforward, beginning at a starting point and executing in a stepwise manner to an end. In this model, design issues can be addressed by units of contiguous program execution. Deviations from the straightforward path are provided by function calls which allow program execution to jump from the main routine to the subroutine, and back again to the main routine. The use of subroutines allows for programming efficiency for implementing common routines; however, with programs becoming increasingly more complicated, and the number of common routines also growing, programs written in procedural languages are becoming increasingly complicated and difficult to maintain.

With modem computer programs becoming increasingly long and complex creations which may have many millions of lines of code, the concept of modularity is becoming increasingly important in the development of software. With a modular approach, the various functions of a computer program may be separated into modules which various programmers can work on independently. One popular programming paradigm that embodies the concept of modularity is that of object-oriented programming (OOP).

The central idea behind object-oriented programming is the object model, where all programs are structured as collections of interrelated objects, each of which represents an instance of some class in a hierarchy of object classes.

Object-oriented programming involves defining, creating, using, and reusing "objects," which can be used to model ideas and things in terms of their features (data) and behaviors (methods). Each object is a self-contained software element including data and methods for operating on the data. Objects are created by defining object classes from which objects are created, or "instantiated." The object classes are templates for creating objects. Each object created from a particular object class includes all the data and methods of the object class, as well as data and methods from its superclasses, and different objects of the same object class may be used for different purposes. Common object-oriented programming languages include Smalltalk, C++, and Java.

Other, non-OOP approaches are also commonly used, such as embodied in procedural programming languages and functional programming languages.

When design features may be cleanly divided among distinct elements, these approaches capture the benefits of modularity very well. However, these approaches fail to provide the proper support in certain situations, such as those involving shared resources, error handling, or other systemic issues where the same or similar functionality affects or is affected by many different elements.

The reason why these approaches are insufficient is that those issues cross-cut the primary modularization of the systems. Cross-cutting occurs when some particular concern depends on and/or must affect parts of the implementation of several of the functional modules of the system. Functional modules may include such software entities as objects and program modules, among others, and cross-cutting may occur across different software entities, in different places within the same software entities, or a combination of the two. Many cross-cuts are not weaknesses of the designs; they are a natural and unavoidable phenomena in complex systems, and they are the basis for the concept of "aspect."

Implementing those cross-cutting concerns in traditional programming languages, even object-oriented ones, typically requires scattering bits of code throughout the program, resulting in code that is referred to as "tangled."

An aspect is a concern that cross-cuts the primary modularization of a software system. An aspect-oriented programming language extends traditional programming languages with constructs for programming aspects. Such constructs can localize the implementation of cross-cutting concerns in a small number of special purpose program modules, rather than spreading the implementation of such concerns throughout the primary program modules. As with other types of software elements, an aspect may include both data and methods.

In order to capture the cross-cutting nature of aspects, such special program modules break the traditional rules of encapsulation in principled ways. They can affect the implementation of software entities implementing primary functionality without the explicit consent of those software entities; further, they can do that for several software entities simultaneously.

Aspect oriented programming (AOP) extends the expressive facilities available to the programmer, so that many design decisions can be expressed locally. The AOP programmer writes the base program in a traditional programming language, and also writes pieces of aspect code, each of which affects executions that are described in some parts of the base program.

In such a manner, aspect code can localize the implementation of some design patterns in a few modules, rather than spreading the fields and methods of those patterns throughout the classes, and can capture the tracing, debugging and instrumentation support for a complex system in a few modules, capture error handling protocols involving several classes in a single module, and capture resource sharing algorithms involving several classes in a single module, rather than as multiple code fragments tangled throughout the classes.

The special program modules for programming aspects enable this by cross-cutting the modularity of classes in principled ways. So one of those special program modules can affect the implementation of several classes (or several methods within a single class) in a clean, principled way. Aspect-Object interaction differs from Object-Object interaction and other traditional programming paradigms in that with the traditional approaches, all behaviors of the objects are encapsulated in the objects themselves, either as a direct implementation in the object class definition, as a request encoded in the object class definition to use the behaviors of other objects (e.g., a method call), or as a request in the object class definition to reuse the implementations of other object classes (e.g., through inheritance). Thus, in these traditional approaches, all control of an object's behavior lies with the object itself. In the AOP environment, on the other hand, a part of the object's behavior can be defined in an aspect outside of the object without the object having to request the behavior in any way. Thus, it can be said that a part of the object's behavior is transparently forced on the object by the aspect. Moreover, aspects have a more global effect in that one aspect can forces its behavior on multiple objects, possibly of different classes.

The paradigm of Aspect-Oriented Programming (AOP) was first introduced in Gregor Kiczales et al., Aspect-Oriented Programming in Proceedings of the European Conference on Object-Oriented Programming (ECOOP 97), June 1997 ("Kiczales"), which is hereby incorporated by reference. A new unit of software modularity, called an aspect, is provided that appears to provide a better handle on managing cross-cutting concerns.

In Kiczales, only highly domain-specific aspect-oriented systems had been developed. It also addresses a goal of developing a general purpose AOP mechanism. However, it remains unknown in the art how to generalize from the very specific examples of AOP to arrive at the necessary abstractions to create a general model. Thus, aspect-oriented programming has remained a hypothetical paradigm having the goal of providing a clean separation between and among components and aspects.

While it is desirable to ensure correct design using preconditions and postconditions during the development of a software program, it becomes undesirable to retain those preconditions and postconditions once the software program is complete because of they are no longer necessary, and only serve to increase the size of the program, and decrease execution speed. However, since the code for implementing the preconditions and postconditions cross-cut code for the program module being developed, the task of removing the preconditions and postconditions after testing involves substantial editing of the software entity embodying the resource.

The features of the Eiffel programming language have some similarities with aspects, but they are significantly different. First of all, in Eiffel the assertions are coded within the classes, and not in separate modules. Each method in Eiffel can include a "header" with preconditions and a "footer" with postconditions, but there is no way to program those assertions outside of the methods, and with a more global perspective. So, in an Eiffel application the design contract does not correspond to an implementation contract module in the program.

Second, the assertions in Eiffel are part of the classes, and not imposed on them. In the current invention, assertions can be imposed by aspect modules on other modules of the program. One useful usage of this is to provide contracts for interfaces (modules with operations but without implementations).

SUMMARY OF THE INVENTION

The present invention is directed to the development of software programs using Design by Contract methodology implemented in an aspect-oriented programming environment. A presently employed aspect-oriented programming environment is called AspectJ.

AspectJ is an extension to the object-oriented Java programming language. In AspectJ, object code is encapsulated in Java classes, and aspect code is encapsulated in special program modules called "aspects".

BRIEF DESCRIPTION OF THE DRAWINGS

FIG. 1 is a block diagram of a software entity developed using Design by Contract methodology according to the prior art.

FIG. 2 is a block diagram of an embodiment of designing by contract according to the present invention.

DETAILED DESCRIPTION OF THE INVENTION

In accordance with the present invention, the system of the present invention executes on a computer, such as a general purpose personal computer of a type well-known in the art. The present invention implements system monitoring functionality using aspect-oriented programming techniques. The system and monitor according to a present embodiment of the invention are implemented as computer software which may be installed directly on a local computer used for practicing the invention, such as by loading the software from non-volatile storage, or may be downloaded from one or more remote sites and installed on the local computer, or may even be installed from one or more remote computers.

FIG. 1 depicts a representative software entity 100 developed using Design by Contract principles in the prior art. The software entity 100 is compiled using a compiler 110 to produce object code 130 embodying both the program functionality and the contracts. Representative source code for software entity 100 appears in Table 1, below.

TABLE 1

Account Object Class with Contracts

```
public class Account {
    /**
     * Constructor
     */
    public Account (String owner, int accountNumber) {
        Contract.require(owner != null && owner.length() > 0);
        Contract.require(accountNumber > 0);
        _owner = owner;
        _accountNumber = accountNumber;
    }
    /**
     * Deposit amount
     */
    public void deposit (float amount) {
        Contract.require(amount > 0.0, this);
        _balance = _balance + amount;
    }
    /*
     * Returns true if balance would be greaterEqual zero after
     * withdraw of amount.
     *
     * @ require amount > 0.0
     */
    public boolean isWithdrawPossible (float amount) {
        Contract.require(amount > 0.0, this);
        return (_balance - amount >= 0);
    }
    /**
     * Withdraw amount
     *
     * @ require amount > 0
     * @ require isWithdrawPossible(amount)
     * @ ensure balance() == oldBalance - amount
     */
    public void withdraw (float amount) {
        Contract.require(amount > 0, this);
        Contract.require(isWithdrawPossible(amount), this);
        float oldBalance = balance();
        _balance = _balance - amount;
        Contract.ensure(balance() == oldBalance - amount, this);
    }
    /**
     * returns the actual balance of the account
     */
    public float balance () {
        return _balance;
    }
    /**
     * returns the name of the owner of the account
```

TABLE 1-continued

Account Object Class with Contracts

```
     *
     * @ ensure result != null && result.length() > 0
     */
    public String owner () {
        Contract.ensure(_owner != null && _owner.length() > 0, this);
        return _owner;
    }
    /**
     * returns the number of the account
     *
     * @ ensure result > 0
     */
    public int accountNumber () {
        Contract.ensure(_accountNumber > 0, this);
        return _accountNumber;
    }
    // private attributes
    private float _balance;
    private String _owner;
    private int _accountNumber;
}
```

In this example, a bank Account object is shown. The use of both contract preconditions and postconditions is illustrated, for example, in the function labeled "Withdraw." If a withdrawal is attempted, the calling program passes an amount to be withdrawn to the Account object. A contract specifies preconditions (Contract.requires) to require that amount does not result in the account having a negative balance after deducting amount from balance, and that amount is non-zero.

The contract also specifies postconditions (Contract.ensure) to ensure that the balance after making the withdrawal is initial balance, oldBalance, minus the withdrawal amount, amount.

Consider, for example, the invocation of function withdraw. If a precondition is violated then the caller of withdraw is passing invalid amount. On the other hand, if a postcondition is violated then the implementation of withdraw has a bug.

The other functions include preconditions and/or postconditions which are treated similarly to those of the function withdraw.

In a present embodiment of the invention, the behavior of Contract.requires may be described as detecting the satisfaction or violation of a precondition, and the behavior of Contract.ensure may be described as reporting the satisfaction or violation of a precondition. Contract.requires does this by calling a function requires in object class Contract, and Contract.ensure acts by calling a function ensure in object class Contract, such as in the example below.

```
public class Contract
{
    /**
     * check a precondition
     */
    public static void require (boolean precondition)
    {
        if (!precondition)
            throw new ContractBrokenException("precondition violated");
        System.out.println ("precondition checked");
    }
    /**
     * check postcondition
     */
    public static void ensure (boolean postcondition)
    {
        if (!postcondition)
            throw new ContractBrokenException("postcondition violated");
        System.out.println ("postcondition checked");
    }
}
```

As can be seen from this example of Table 1, the code for implementing contract language (shown in italics) is interspersed with the code implementing program functionality. This means that when the contract language is no longer needed, a developer must carefully find and remove each line of contract code. If the developer decides to forego removing the contract code, the resulting object code will be larger and slower, but if the develop does remove the contract code, and later needs to make modifications, then the contract language must be added again.

With the present invention, on the other hand, the contracts can be easily added and removed, sometimes referred to as being "plugged in" and "unplugged" from an application. FIG. 2 depicts an implementation of the software entity using Design by Contract according to the present invention. A software entity 205 containing source code for implementing primary program functionality created according to conventional programming techniques without Design by Contract appears in Table 2. Source code for Design by Contract preconditions and postconditions is implemented in a contract aspect 210, and appears in Table 3. When the software entity and contract aspect are compiled by compiler 220, object code 240 is produced which is functionally equivalent to the object code 130 produced in the prior art example of FIG. 1.

TABLE 2

Account Object Class

```
public class Account {
    /**
     * Constructor
     */
    public Account (String owner, int accountNumber) {
        _owner = owner;
        _accountNumber = accountNumber;
    }
    /**
     * Deposit amount
     */
    public void deposit (float amount) {
        _balance = _balance + amount;
    }
    /*
     * Returns true if balance would be greaterEqual zero after
     * withdraw of amount.
     *
     * @ require amount > 0.0
     */
    public boolean isWithdrawPossible (float amount) {
        return (_balance - amount >= 0);
    }
    /**
     * Withdraw amount
     */
    public void withdraw (float amount) {
        _balance = _balance - amount;
    }
    /**
     * returns the actual balance of the account
     */
```

TABLE 2-continued

Account Object Class

```
    public float balance () {
        return __balance;
    }
    /**
     * returns the name of the owner of the account
     *
     * @ ensure result != null && result.length() > 0
     */
    public String owner () {
        return __owner;
    }
    /**
     * returns the number of the account
     *
     * @ ensure result > 0
     */
    public int accountNumber () {
        return __accountNumber;
    }
    // private attributes
    private float __balance;
    private String __owner;
    private int __accountNumber;
}
```

TABLE 3

Contracts Aspect for Account Object Class

```
/**
 * The contract implementation for the Account class.
 */
public aspect Account_Contract {
    static advice public new (String owner, int accountNumber) &
    Account {
        before {
            Contract.require(owner != null && owner.length() > 0);
            Contract.require(accountNumber > 0);
        }
    }
    static advice (public void deposit (float amount) |
                   public void isWithdrawPossible(float amount) |
                   public void withdraw(float amount)) & Account {
        before {
            Contract.require(amount > 0.0, thisObject);
        }
    }
    static advice public void withdraw (float amount) & Account {
        float oldBalance;
        before {
            Contract.require(isWithdrawPossible(amount), thisObject);
            oldBalance = balance();
        }
        after {
            Contract.ensure(balance() == oldBalance - amount,
                thisObject);
        }
    }
    static advice public String owner () & Account {
        after {
            Contract.ensure(__owner != null && __owner.length() > 0,
                thisObject);
        }
    }
    static advice public int accountNumber () & Account {
        after {
            Contract.ensure(__accountNumber > 0, thisObject);
        }
    }
}
```

In this embodiment, the Account object in Table 2 encapsulates the functionality for creating accounts, and making deposits and withdrawals while the Contract aspect in Table 3 contains all the preconditions and postconditions for ensuring proper behavior. The behavior of the contract preconditions and postconditions is the same as in the prior art example.

The behavior of the aspect is forced on the object class using a compiler that is aspect-oriented, i.e., one that can handle aspects. Such a compiler compiles the object class definitions and aspect definitions of a system such that the code from the aspects affects the behavior of the objects. Such a compiler is described in greater detail in copending patent application, U.S. Ser. Pat. No. 09/357,738, entitled ASPECT-ORIENTED PROGRAMMING, assigned to the present assignee, and is hereby incorporated into the present specification by reference.

While the present invention has been described in relation to an object-oriented environment, those skilled in the art will appreciate that these techniques may readily be applied to other programming paradigms without departing from the spirit and scope of the present invention.

What is claimed is:

1. In a computer system having a processor, memory, and an aspect-oriented operating environment that supports an aspect which implements concerns that cross-cut an overall functionality of a first software entity, the first software entity being callable by a second software entity, the first software entity comprising one or more of a program body and an object class, the aspect operating by transparently forcing its behavior on the first software entity, a contract comprising:

an aspect that defines cross-cutting functionality that defines one or more of a precondition and a postcondition associated with a first software entity, wherein:
1) a precondition defines a condition that the second software entity must satisfy when calling the first software entity;
2) a postcondition defines a condition that the first software entity will satisfy when called by the second software entity; and
3) the aspect transparently forces its behavior on the first software entity, the aspect comprising:
i) functionality that detects satisfaction and violation of the condition; and
ii) functionality that provides a notification that the condition has been satisfied or violated.

2. In a computer system having a processor, memory, and an aspect-oriented operating environment that supports aspects which implement concerns that cross-cut an overall functionality of software entities comprising one or more of program bodies and object classes, the aspects operating by transparently forcing their behavior on software entities, a method for creating a first software entity for use by a second software entity, the method comprising:

a) defining a first software entity including computer-executable instructions implementing overall functionality for the first software entity;
b) creating an aspect that implements a contract for the first and second software entities;
c) defining in the aspect one or more of a precondition and a postcondition, wherein a precondition defines a condition that the second software entity must satisfy when calling the first software entity, and the postcondition defines a condition that the first software entity will satisfy when called by the second software entity; and
d) transparently forcing contract behavior defined by the aspect on the first software entity.

3. The method of claim 2, further comprising:

defining in the aspect functionality that detects satisfaction and violation of the condition; and defining in the aspect functionality that provides a notification of satisfaction or violation of the condition.

4. The method of claim 2, further comprising removing the contract behavior.

5. In a computer system having a processor, memory, and an aspect-oriented operating environment that supports aspects which implement concerns that cross-cut an overall functionality of software entities comprising one or more of program bodies and object classes, the aspects operating by transparently forcing their behavior on software entities, a method for applying Design by Contract methodology to a first software entity to be used by a second software entity, the method comprising:

a) creating an aspect that implements a contract for the first software entity;

b) defining in the aspect one or more of a precondition and a postcondition, wherein a precondition defines a condition that the second software entity must satisfy when calling the first software entity, and the postcondition defines a condition that the first software entity will satisfy when called by the second software entity; and c) transparently forcing behavior defined by the aspect on the first software entity.

6. The method of claim 5, further comprising removing the contract behavior.

* * * * *